United States Patent
Altuev

(10) Patent No.: US 10,841,642 B2
(45) Date of Patent: Nov. 17, 2020

(54) SYSTEM AND METHOD FOR MASKING OBJECTS IN A VIDEO ARCHIVE UPON THE DEMAND OF USERS

(71) Applicant: OOO ITV Group, Moscow (RU)

(72) Inventor: Murat K. Altuev, Chernogolovka (RU)

(73) Assignee: OOO ITV Group, Moscow (RU)

( * ) Notice: Subject to any disclaimer, the term of this patent is extended or adjusted under 35 U.S.C. 154(b) by 86 days.

(21) Appl. No.: 16/162,366

(22) Filed: Oct. 16, 2018

(65) Prior Publication Data

US 2019/0261045 A1 Aug. 22, 2019

(30) Foreign Application Priority Data

Feb. 16, 2018 (RU) ................................ 2018105895

(51) Int. Cl.
| | |
|---|---|
| *G06T 7/20* | (2017.01) |
| *H04N 21/431* | (2011.01) |
| *G06T 7/246* | (2017.01) |
| *G06K 9/00* | (2006.01) |
| *G06K 9/32* | (2006.01) |
| *G06T 3/40* | (2006.01) |
| *H04N 7/18* | (2006.01) |
| *H04N 21/845* | (2011.01) |

(52) U.S. Cl.
CPC ..... *H04N 21/4318* (2013.01); *G06K 9/00771* (2013.01); *G06K 9/3241* (2013.01); *G06T 3/4007* (2013.01); *G06T 7/246* (2017.01); *H04N 7/181* (2013.01); *H04N 21/8456* (2013.01); *G06T 2207/30241* (2013.01)

(58) Field of Classification Search
CPC ........... G06K 9/00771; G06K 9/00718; G06K 9/0071; G06K 9/3241; G06K 9/00825; G06K 9/00744; G06K 9/6269; H04N 21/4318; H04N 7/181; G06T 7/181
USPC ............. 382/190, 284, 294; 348/143, 207.1; 386/241

See application file for complete search history.

(56) References Cited

U.S. PATENT DOCUMENTS

| | | | |
|---|---|---|---|
| 2010/0328460 A1* | 12/2010 | Merkel | G08B 13/19652 348/143 |
| 2013/0108105 A1 | 5/2013 | Yoo et al. | |
| 2014/0023248 A1 | 1/2014 | Yoo et al. | |
| 2014/0185920 A1 | 7/2014 | Kelley et al. | |
| 2016/0155465 A1* | 6/2016 | Park | G11B 20/005 386/241 |

FOREIGN PATENT DOCUMENTS

RU 2634225 C1 10/2017

* cited by examiner

*Primary Examiner* — Phuoc H Doan
(74) *Attorney, Agent, or Firm* — IRL Legal Services, LLC; Ilya R. Lapshin

(57) ABSTRACT

Protection of confidential information, and more specifically to systems and methods for processing video information received from video surveillance cameras, in order to mask private information on demand in a video archive. The system for masking objects in the video archive comprises a video surveillance camera, a memory unit that allows storage of the video data from video surveillance cameras, a processor for processing video data in accordance with instructions received from a graphical user interface, the graphical user interface containing data input and output.

29 Claims, 3 Drawing Sheets

SYSTEM AND METHOD FOR MASKING OBJECTS IN A VIDEO ARCHIVE UPON THE DEMAND OF USERS

RELATED APPLICATIONS

This application claims priority to Russian Patent Application RU 2018105895, filed Feb. 16, 2018, which is incorporated herein by reference in its entirety.

FIELD OF THE INVENTION

The present invention relates to the protection of confidential information, and more specifically to systems and methods for processing video information received from video surveillance cameras, in order to mask private information in a video archive on demand.

BACKGROUND

Video surveillance systems are software and hardware or technical means that use, among other things, computer vision methods for automated data collection, based on the analysis of streaming video. Video surveillance systems can rely on image processing algorithms, that allow to analyze video without direct participation of a person. Video surveillance systems, depending on specific goals, can implement a set of functions, such as: detection of objects, tracking the movement of objects, recognition of objects, identification of objects, etc.

Current video surveillance systems, for example, closed-circuit television systems (CCTV) are rapidly deployed to ensure overall security in protected areas. Along with that most enterprises are equipped with cameras the city video surveillance system is already developed in many cities.

In proportion to the speed of distribution of such systems, there is a growing need to protect the privacy of people. Confidentiality of people must be protected for a number of reasons. For example, for some people it is simply uncomfortable to be constantly under the video surveillance, and for some (for example, celebrities or just wealthy citizens) it is even unsafe. Although, the data on people is recorded unintentionally, it is stored and can become public on the Internet. To solve this problem, various methods for masking private information have been developed. The most frequently used are the methods for recognizing faces or objects, with subsequent encryption of video in the area of the detected object. However, these methods require high computing power for high-quality masking of private information.

From the field of invention, the invention disclosed in the US patent application 2014/0023248 A1, published Jan. 23, 2014, is known, along with that the device and method for protection of confidential information in video images are disclosed. The specified device comprises: a unit for dividing the video sequence into frames; a unit for detection of persons; a face recognition unit configured to compare detected persons to the target person; and a processing unit for selectively masking a face area. The specified solution requires high computing power because it recognizes all faces in the video to be able to compare it to the target face image afterwards.

Also, another invention is known from the US patent application 2016/0155465 A1, published Jun. 2, 2016, along with that a method for masking video data is disclosed. The main steps of this method are: detection of an area in the video frame which should be masked; masking of the detected area; inserting the masking information; saving of the masked frame with the inserted masking information. The main drawback of this invention is the fact that in order to mask the entire video, the above-mentioned steps of the method are repeated for each frame of the video.

The closest in technical essence is the invention disclosed in the US patent application 2010/0328460 A1, published Dec. 30, 2010, which characterizes a method for masking selected objects. This invention describes a module for masking data in a video surveillance system, including cameras located in the monitoring zone, which detect all moving objects. The video surveillance system contains a device for selecting objects, and the masking module is designed to display the area of selected objects in masked form, and masking is carried out in a specified limited area of the monitoring zone. The main difference of this invention from the claimed invention is the logic of masking objects in the specified control area, which is determined by the distance from the camera by the chart of the depth of a scene. In addition, this invention does not imply an automatic calculation of the positions of the obscuring areas on intermediate video frames by interpolation.

BRIEF SUMMARY

The invention is aimed at eliminating the drawbacks of the older-level equipment and developing the already known inventions.

The technical result of the claimed group of inventions is a broader range of technical means regarding masking objects in a video archive, and also the decrease in the computing complexity of such systems achieved by setting a reference area that obscures the selected object in the first and the last frame and calculating the positions of the calculated areas in the intermediate frames by interpolation.

This technical result is achieved due to the fact that the system of masking objects in a video archive comprises: at least one video surveillance camera; a memory unit that allows storage of the video data from video surveillance cameras; at least one processor for processing video data in accordance with the instructions received from the graphical user interface; the graphical user interface containing the means of data input and output; the mentioned means of data input contain: a request receiving unit configured to receive user requests to mask an image of a particular selected object; a reference area setting unit configured to allow a system operator to set a reference area obscuring the selected object, while the reference area is set in the first and the last frame of the video from the video archive where the selected object is visible; the area position interpolation unit configured to automatically calculate positions of the calculated areas on intermediate frames between the first and the last video frames by interpolation; a video storage unit configured to store the modified video in a video archive, while the modified video includes reference and calculated areas obscuring the selected object on each of its frames in the set interval between the first and the last frame.

In one possible implementation of the invention, an object is mobile or motionless.

In another possible implementation of the invention, an object can be one of the following: a person, a human face or a vehicle license plate number.

In one possible implementation of the invention, the reference area setting unit is additionally configured to allow the system operator to specify at least one of the following: the area shape, the area color, the area content, and the specified area may comprise an image or a text.

In another possible implementation of the invention, the reference area has one of the following shapes: an oval, a circle, a rectangle, a polygon.

In one possible implementation of the invention, the interpolation is performed assuming that the selected object, which should be masked, moves directly and evenly.

In another possible implementation of the invention, there is information about objects trajectories for at least one video surveillance camera.

In one possible implementation of the invention, the graphical user interface additionally comprises an object trajectory selection unit, that is configured to enable selecting a particular selected object trajectory, and the interpolation unit is additionally configured to enable taking the selected object trajectory into account when calculating the positions of the calculated areas.

In another possible implementation of the invention, the reference area setting unit is additionally configured to allow the operator to edit the calculated areas prior to saving the modified video.

In one possible implementation of the invention, the operator can edit the calculated area on at least one of the intermediate frames, therefore the edited area becomes the reference area and the video becomes divided into at least two intervals, and the interpolation unit in that case will automatically recalculate the positions of the calculated areas on each intermediate frame within the received intervals.

In another possible implementation of the invention, the interpolation unit is configured to enable recalculating the positions of the calculated areas in case the system operator adds at least one additional reference area before or after the already masked video interval by using the reference area setting unit.

In one possible implementation of the invention, the reference area setting unit is additionally configured to allow the operator to delete at least one reference area, while the interpolation unit recalculates the positions of the calculated areas.

In another possible implementation of the invention, the video storage unit saves the modified video instead of the original video received from the video archive.

In one possible implementation of the invention, after saving the modified video, the set reference areas and the calculated areas remain unchanged and are displayed when viewing the modified video and exporting it from the system.

The specified technical result is also achieved due to the method of masking objects in a video archive implemented by the computing system. the method comprises the following steps: obtaining the video data from at least one video surveillance camera; saving the received video data in the video archive; receiving the user request to mask an image of the particular selected object; providing the system operator with the ability to specify a reference area that obscures the selected object, and the reference area is set in the first and the last frame of the video from the video archive where the selected object is visible; automatically calculating the positions of the calculated areas on intermediate frames between the first and the last video frames by interpolating the positions of the areas; saving the modified video in the video archive, while the modified video includes references and calculated areas obscuring the selected object on each of its frames in the set interval from the first to the last frame.

And also, this technical result is achieved due to a computer-readable data carrier comprising instructions executable by the computer processor for implementing variants of methods for masking objects in the video archive.

DETAILED DESCRIPTION

Below, the description of possible implementation of the claimed group of inventions is provided. However, the claimed group of inventions is not limited to only these implementations. It will be obvious to experts that other implementation variations may be included within the scope of the claimed group of inventions described in the formula.

In its implementation variations, the invention can be executed in a form of systems and methods implemented by various computer means, as well as in a computer-readable data carrier containing the instructions executable by the computer processor.

Figure 1:
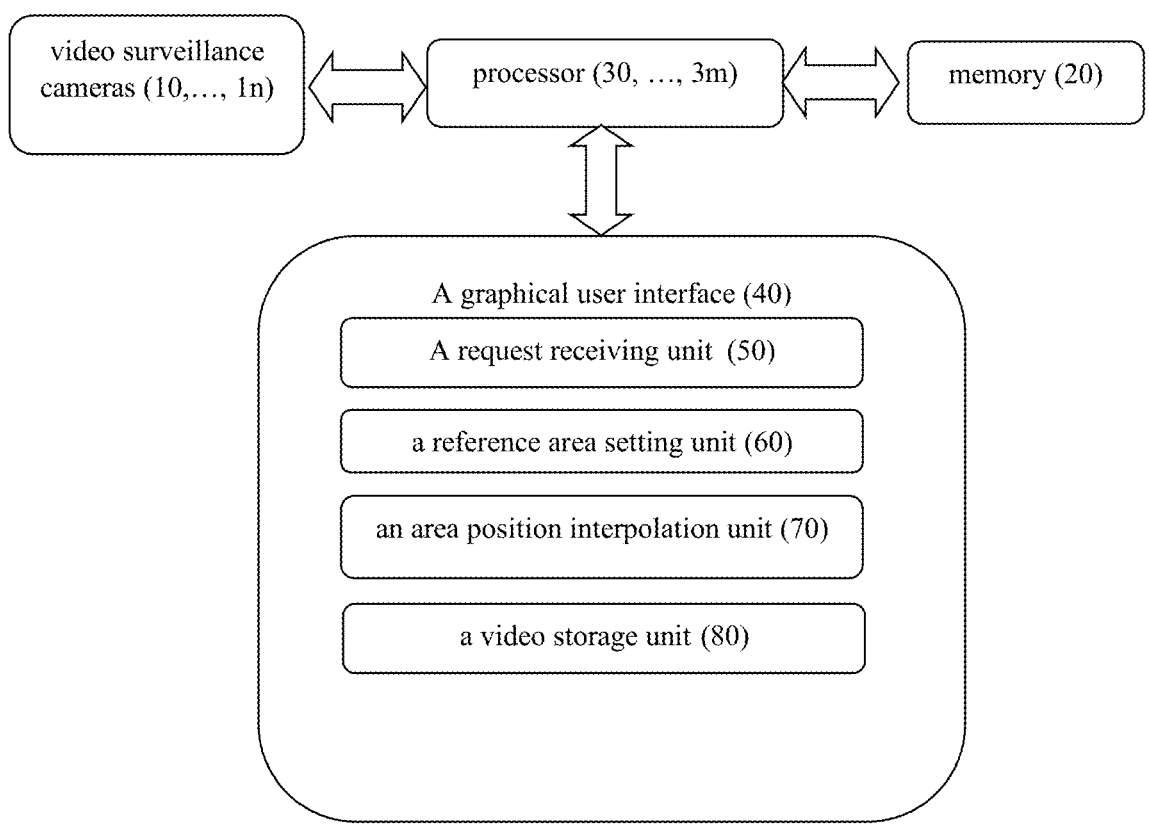
FIG. 1 is a block diagram of a system for masking objects in a video archive.

FIG. 1 shows a block diagram of a system for masking objects in a video archive. The system includes: at least one video surveillance camera (10, . . . , 1n); memory storage (20); at least one processor (30, . . . , 3m); and a graphical user interface (40) which comprises: a request receiving unit (50), a reference area setting unit (60), an area position interpolation unit (70), and a video storage unit (80). These user interface units are data entry means, while the user interface includes also data output means (not shown).

In this context, systems are any computing systems built on the basis of software and hardware, such as: personal computers, smartphones, laptops, tablets, etc.

Processor of computer system in certain implementations can be replaced by: a microprocessor, a computer (electronic computer), a PLC (programmable logic controller) or integrated circuit.

The following items can (but not limited to) act as a memory device: hard drives (HDD), a flash memory, a ROM (read-only memory), solid-state stores (SSD), etc.

Graphical User Interface (GUI) represents a system of means for user interaction with the computer system based on representation of all system objects and functions available to the user in a form of graphic components of the screen (windows, icons, menus, buttons, lists, etc.). At the same time, the user has random access (by means of input devices) to all visible display objects—interface units, which are displayed on the display (monitor). The user input device can be represented by, but is not limited to, for example, a mouse, a keyboard, a touchpad, a stylus, a joystick, a trackpad, etc.

It should be noted that this computer system may include any other devices known in this field of inventions.

Next, an example of the above-mentioned system of masking objects in a video archive performance will be described in detail. All steps of the system operation described below are also applicable to the implementation of the claimed method for masking objects in a video archive.

As it is known, video data received from video surveillance cameras are stored in a video archive systems of the video surveillance system. The main objective of the invention is that any person who gets into the field of view of video surveillance cameras can contact an operator of the system and request to remove his/her image from a video archive. In another case, a user can contact the operator with a request to remove an image of any object from a video archive. An object can be either mobile or motionless. For example, the object can be: a person, a human face, a vehicle, a number of a vehicle, a pet, etc. It will be obvious to an expert that this list of capabilities of the proposed system for masking objects is not limited. It is possible to mask any private information which is present in a video frame.

To achieve this objective, the system's graphical user interface comprises a request receiving unit configured to receive user requests to mask the image of a particular object.

For example, let's assume that an operator receives a request from the user to mask his full-length image in the video from video surveillance cameras. In order to do this, the user interface of the system comprises a reference area setting unit configured to allow the system operator to specify a reference area that obscures the required object. The operator selects the object (upon the demand of the user) and manually sets the reference area in the first and the last frame of video from the video archive where the selected object is visible. For example, in the request, the user can specify the particular day and time when he/she was in the protected zone. Then, based on this information, the operator quickly finds the first frame where the selected object appears, and the last frame, after which the selected object disappears from the area of view of the video surveillance cameras. By means of the reference area setting unit the operator can set the reference area shape (for example: rectangle, polygon, oval, circle, etc.) and color. It should be noted that the operator can set area of any other shape, for example, by means of the polyline (the broken line). In addition, the operator can insert a neutral image or text into the selected area. The text can comprise information about the date and/or time when the selected object was masked and/or the serial number of the request received by the operator.

Figure 2:
FIG. 2 is an example a reference area, set by an operator, that masks an object in a video frame.

FIG. 2 shows an example of a reference area, set by an operator, that obscures an object in the video frame. Since it is necessary to mask a full-length image of a person, the operator selected the most suitable shape for this purpose—a rectangle.

After the reference areas are set, the area position interpolation unit automatically calculates positions of the obscuring areas on intermediate frames between the first and the last video frame where the selected object is visible by interpolation. The interpolation means the use of already known data on reference areas (for example, size, location in a frame and etc.) to obtain similar expected areas on intermediate video frames. The obscuring areas calculated by interpolation will be referred to hereinafter as the calculated areas. The positions of the calculated areas are calculated is made assuming that the selected object moves directly and evenly.

If there is information about objects trajectories for video surveillance cameras, this information can be used to speed up the process of masking objects. The specified information can be defined with help of video analytics, built in each video surveillance camera. In that case, the location of moving objects is defined by sensors that capture various parts of the spectrum (visible, thermal) or detectors. In addition, information about the objects trajectories can be calculated on the server for any camera in the video surveillance system.

In case such information exists, a block for selecting the object trajectory is provided in the graphical user interface of the system. By means of this unit, the operator can select a particular object trajectory and then using the interpolation the system automatically calculates the positions of the calculated areas obscuring the object throughout the interval of its location in the video with a minimum number of reference areas.

It should be noted that the reference area setting unit is additionally configured to allow the operator to edit the calculated areas. For example, the operator can modify the position of the calculated area on one or more intermediate frames. Let's assume that the operator edited one calculated area on an intermediate frame. As a result, the edited area also becomes a reference area, and the video interval set by initial reference areas, thus, breaks into two intervals: from the first frame to the edited intermediate frame, and from the specified intermediate frame to the last frame. In this case, the interpolation unit automatically recalculates the positions of the calculated areas on each intermediate frame within the two obtained intervals, taking into account the new conditions, all according to the same algorithm as described above.

In one possible implementation of the invention, the operator can add one or more additional reference areas before or after the already masked video interval. In this case, the interpolation unit will also recalculate the positions of the calculated areas in each of the received intervals.

In addition, if the operator for some reason decides that one (or more) of the reference areas set by him are not needed, then for this case the reference area setting unit allows the operator to delete the unnecessary reference area, and the interpolation unit will again recalculate the positions of the calculated areas.

After the operator completed editing all necessary obscuring areas, and the interpolation unit automatically calculated the positions of the calculated areas in each of the received intervals between the reference areas, the operator can save this modified video in a video archive instead of the original video by using a video storage unit located in graphical user interface. After saving the modified video, the obscuring areas (reference and calculated) become unchangeable and undeletable by any means of the video surveillance system, and are displayed when exporting it from the system. Video can be exported from the system in any of the video formats.

Figure 3:
FIG. 3 is an example of a frame of a modified video stored in a video archive.

FIG. 3 shows an example of a frame of a modified video. In the frame the selected object is displayed in an unrecognizable form, namely: the object is masked by a black rectangular area.

Figure 4:
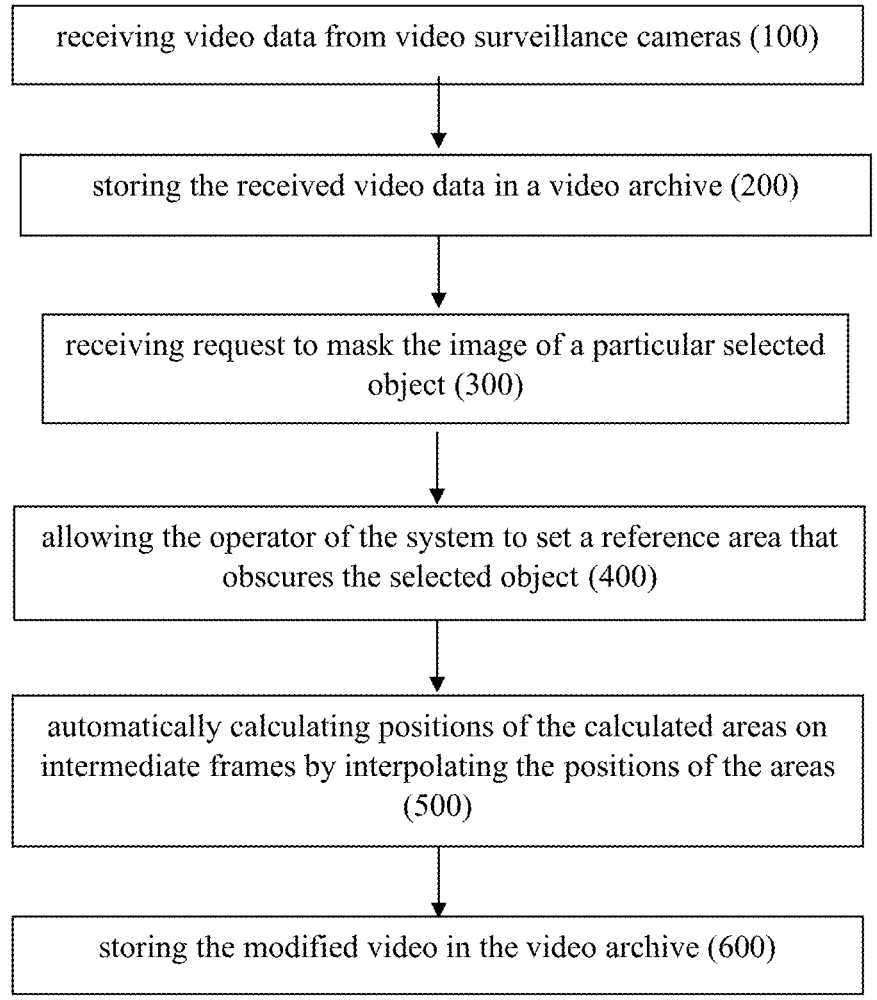
FIG. 4 is a block diagram of a method for masking objects in a video archive.

Next, an example of a certain method for masking objects in a video archive will be described. For an example, FIG. 4 shows the block diagram of one of possible implementations of the method for masking objects in the video archive.

The method comprises the following steps:

(100) receiving video data from at least one video surveillance camera;

(200) storing the received video data in the video archive;

(300) receiving the request to mask an image of the particular selected object;

(400) allowing the operator of the system to set the reference area that obscures the selected object, and the reference area is set in the first and the last frame of the video from the video archive where the selected object is visible;

(500) automatically calculating the positions of the calculated areas on the intermediate frames between the mentioned first and last video frames by interpolating the positions of the areas;

(600) storing the modified video in the video archive, while the modified video includes the references and calculated areas masking the selected object on each of its frames in the set interval from the first to the last frame.

It should be noted that this method can be implemented through the use of a computer system and, therefore, it can be expanded and specified by all the possible implementations that have already been described above for implementing the computer system for masking objects in the video archive.

In addition, possible implementations of this group of inventions can be implemented with use of software, hardware, software logic, or their combination. In this exemplary implementation, the program logic, software, or instruction set is stored in one of the conventional computer-readable media, i.e., a computer-readable data carrier.

In the context of this document, a "computer-readable data carrier" can be any medium or means that can comprise, store, transmit, distribute, or transport instructions (commands) that can be used by a computer system such as a computer. The computer-readable data carrier may be a non-volatile computer-readable storage medium.

If necessary, at least part of the various operations viewed in the description of this invention can be performed in a manner different from the presented order and/or simultaneously with each other.

Although this technical invention has been described in detail to illustrate the most popular and currently preferred implementations, it is to be understood that the invention is not limited to the disclosed implementations, and moreover, is intended to be modified and combined with other implementations.

For example, it is necessary to understand that the present invention assumes that, to the possible extent, one or more of the features of any possible implementations may be combined with one or more features of any other implementation.

The invention claimed is:

1. System for masking objects in video data comprising:
   at least one video surveillance camera;
   a memory unit storing the video data received from the at least one video surveillance camera;
   at least one processor processing the video data following instructions received from a graphical user interface; and
   the graphical user interface comprising a data input system and a data output system;
   wherein the data input system comprises:
      a request receiving unit capable of receiving user requests to mask an image of a selected object; and
      a reference area setting unit configured to allow the user to set reference areas masking the selected object in video frames of the video data,
         wherein the reference areas are set in at least two frames of the video data where the selected object is visible;
   an interpolation unit using the reference areas to calculate interpolated masking areas in frames of the video data other than the at least two frames; and
   a video storage storing modified video,
   wherein in the modified video the reference areas and interpolated masking areas are masked in their respective frames.

2. The system of claim 1, wherein the selected object is mobile or motionless.

3. The system of claim 1, wherein the selected object is one of: a person, a human face, and a vehicle license plate number.

4. The system of claim 1,
   wherein the reference area setting unit is further configured to allow the user to set at least one of: a reference area shape, a reference area color, or a reference area content; and
   wherein the reference area comprises an image or a text.

5. The system of claim 1, wherein the reference area is an oval, a circle, a rectangle, or a polygon.

6. The system of claim 1, wherein the interpolated masking areas are calculated assuming that the selected object moves uniformly.

7. The system of claim 1, wherein the at least one video surveillance camera provides object trajectories data for object trajectories in the video data.

8. The system of claim 7,
   wherein the graphical user interface further comprises an object trajectory selection unit, configured to allow the user to select among the object trajectories, and
   the interpolation unit is further configured to use a selected object trajectory for calculating the positions of the interpolated masking areas.

9. The system of claim 1, wherein the reference area setting unit is further configured to allow the user to edit the interpolated masking areas prior to storing the modified video.

10. The system of claim 9,
    wherein the graphical user interface is further configured to allow the user to edit the interpolated masking area in at least one of the frames,
    wherein the edited area is used by the interpolation unit as a reference area.

11. The system of claim 1,
    wherein the interpolation unit recalculates the interpolated masking areas when the user sets at least one additional reference area in at least one of the frames.

12. The system of claim 1,
    wherein the reference area setting unit is further configured to allow the user to delete at least one reference area followed by the interpolation unit recalculating the interpolated masking areas.

13. The system of claim 1, wherein the video storage stores the modified video.

14. The system of claim 1, wherein in the modified video, the reference areas and the interpolated masking areas are fixed and are shown in the modified video and in exported modified video.

15. A method for masking objects in video data comprising:
    obtaining the video data from at least one video surveillance camera;
    saving the received video data in a memory unit;
    receiving a user request to mask an image of a selected object;
    the user setting reference areas masking the selected object in video frames of the video data,
       wherein the reference areas are set in at least two frames of the video data where the selected object is visible;

calculating interpolated masking areas in frames of the video data other than the at least two frames using the reference areas; and storing modified video, wherein in the modified video the reference areas and interpolated masking areas are masked in their respective frames.

16. The method of claim 15, wherein the selected object is mobile or motionless.

17. The method of claim 15, wherein the selected object is one of: a person, a human face, and a vehicle license plate number.

18. The method of claim 15, further comprising the user setting at least one of: a reference area shape, a reference area color, or a reference area content;

wherein the reference area comprises an image or a text.

19. The method of claim 15, wherein the reference area is an oval, a circle, a rectangle, or a polygon.

20. The method of claim 15, wherein the interpolated masking areas are calculated assuming that the selected object moves uniformly.

21. The method of claim 15, further comprising at least one video surveillance camera providing object trajectories data for object trajectories in the video data.

22. The method of claim 21, further comprising the user selecting among the object trajectories; and wherein a selected object trajectory is used for calculating the positions of the interpolated masking areas.

23. The method of claim 15, further comprising user editing the interpolated masking areas prior to storing the modified video.

24. The method of claim 23, further comprising user editing the interpolated masking area in at least one of the frames, wherein the edited area is used as a reference area for calculating the positions of the interpolated masking areas.

25. The method of claim 15, further comprising:

the user setting at least one additional reference area in at least one of the frames; and subsequently, recalculating the interpolated masking areas.

26. The method of claim 15, further comprising:

the user deleting at least one reference area in at least one of the frames; and subsequently, recalculating the interpolated masking areas.

27. The method of claim 15, wherein the modified video is stored in a video storage.

28. The method of claim 15, wherein in the modified video, the reference areas and the interpolated masking areas are fixed and are shown in the modified video and in exported modified video.

29. Non-transitory computer readable medium storing instructions that, when executed by a computer, cause it to perform the method of claim 15.

* * * * *